(12) United States Patent
D'Agostino

(10) Patent No.: US 11,962,612 B2
(45) Date of Patent: Apr. 16, 2024

(54) HOLISTIC ASSESSMENT, MONITORING, AND MANAGEMENT OF DIGITAL PRESENCE

(71) Applicant: ThreatNG Security Inc, Shrewsbury, MA (US)

(72) Inventor: Joseph Phillip D'Agostino, Shrewsbury, MA (US)

(73) Assignee: ThreatNG Security Inc., Shrewsbury, MA (US)

( * ) Notice: Subject to any disclaimer, the term of this patent is extended or adjusted under 35 U.S.C. 154(b) by 259 days.

(21) Appl. No.: 17/319,406

(22) Filed: May 13, 2021

(65) Prior Publication Data

US 2021/0360018 A1 Nov. 18, 2021

Related U.S. Application Data

(60) Provisional application No. 63/023,947, filed on May 13, 2020.

(51) Int. Cl.
*H04L 9/00* (2022.01)
*H04L 9/40* (2022.01)
*H04L 41/02* (2022.01)
*H04L 41/22* (2022.01)

(52) U.S. Cl.
CPC ........ *H04L 63/1433* (2013.01); *H04L 41/024* (2013.01); *H04L 41/22* (2013.01); *H04L 63/1425* (2013.01); *H04L 63/20* (2013.01)

(58) Field of Classification Search
CPC ... H04L 63/1433; H04L 41/024; H04L 41/22; H04L 63/1425
USPC ......................................................... 726/25
See application file for complete search history.

(56) References Cited

U.S. PATENT DOCUMENTS

| 2002/0046041 | A1* | 4/2002 | Lang | G06Q 30/0282 |
| | | | | 705/347 |
| 2009/0070873 | A1* | 3/2009 | McAfee | G06F 21/56 |
| | | | | 726/22 |
| 2017/0212875 | A1* | 7/2017 | Foresti | G06F 16/958 |
| 2019/0349351 | A1* | 11/2019 | Verma | H04L 63/08 |
| 2020/0027097 | A1* | 1/2020 | Sargent | G06Q 30/018 |
| 2021/0029164 | A1* | 1/2021 | Albero | H04L 63/20 |

* cited by examiner

*Primary Examiner* — Christopher J Brown
(74) *Attorney, Agent, or Firm* — Genius Patent APC; Bruce Angus Hare

(57) ABSTRACT

An assessment query may be received and analyzed to identify relevant assessment attributes and select a set of associated assessment resources. Assessment information may be extracted from the set of associated assessment resources. The extracted information may be used to identify additional relevant assessment attributes that may be utilized to extract additional assessment information. The extracted information may be used to generate a comprehensive threat assessment report. The threat assessment report, and the threat assessment, may be updated based on user feedback.

14 Claims, 11 Drawing Sheets

400

Category Profile 410
- Identifier
- Resource(s)
- Evaluation Criteria
- Sub-Categories
- Associated Profile(s)

Client Profile 420
- Identifier
- Configuration Settings
- Associated Profile(s)

Report Profile 430
- Identifier
- Assessment Attributes
- Category Identifiers
- Selection Criteria
- Configuration Settings
- Associated Profile(s)

*FIG. 4*

HOLISTIC ASSESSMENT, MONITORING, AND MANAGEMENT OF DIGITAL PRESENCE

CROSS-REFERENCE TO RELATED APPLICATIONS

This application claims priority to U.S. Provisional Patent Application Ser. No. 63/023,947, filed on May 13, 2020.

BACKGROUND

An entity such as a business, organization, individual, etc. may be associated with a broad (including public and open data) and deep (e.g., associated with the surface, deep, and dark web) digital presence.

Therefore there exists a need for a way to evaluate and manage such digital presence.

BRIEF DESCRIPTION OF THE SEVERAL VIEWS OF THE DRAWING

The novel features of the disclosure are set forth in the appended claims. However, for purpose of explanation, several embodiments are illustrated in the following drawings.

FIG. 4 illustrates a data structure diagram of one or more embodiments described herein, in which various profiles are used to define and select assessment elements and features;

DETAILED DESCRIPTION

Figure 1:
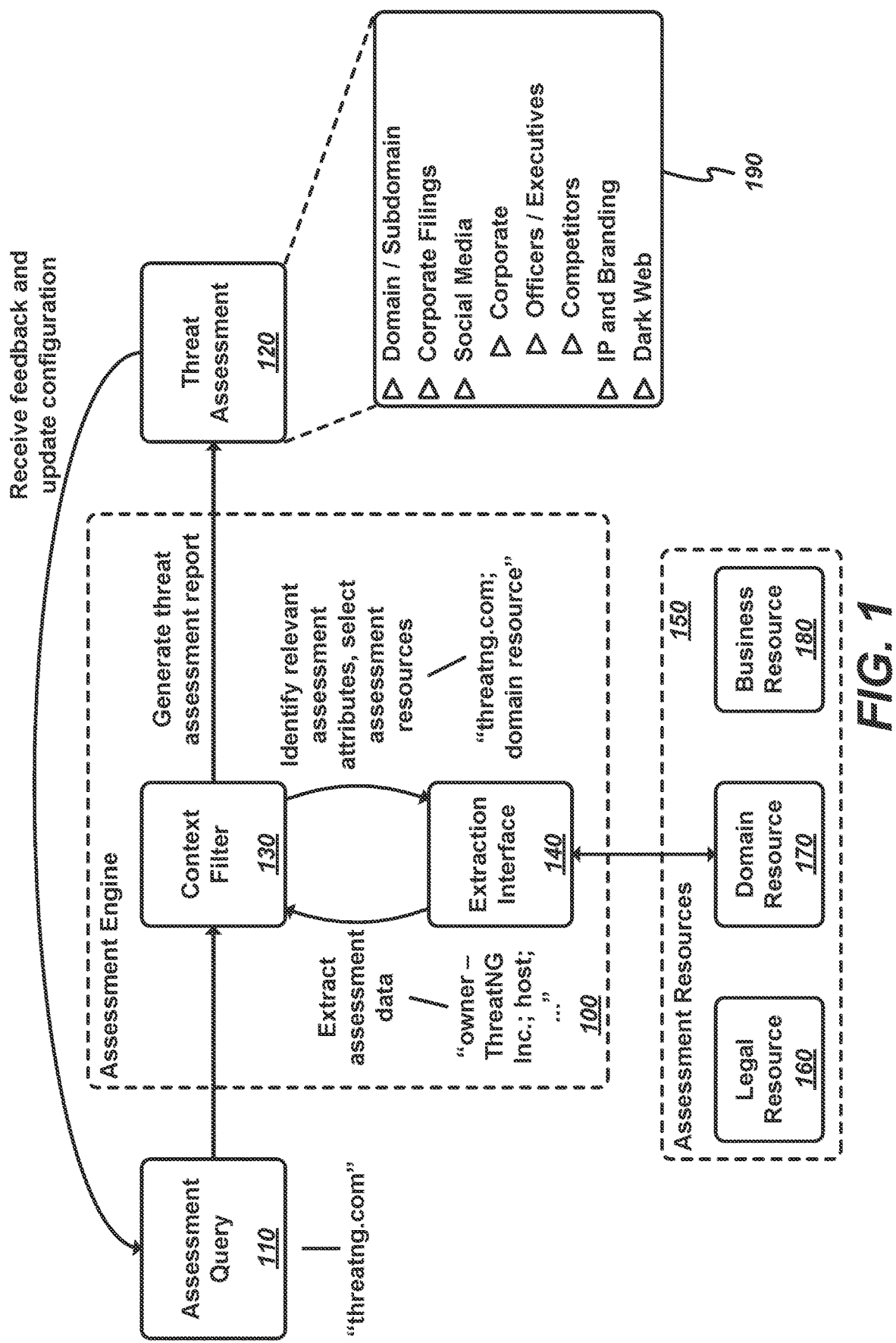
FIG. 1 illustrates an example overview of one or more embodiments described herein, in which an assessment engine receives a query and generates a threat assessment.

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide ways to monitor, assess, and manage digital presence. Digital Presence may be vast with much breadth (including extensive public and open data) and depth (including the surface, deep, and dark web, for instance). Knowledge and awareness of the digital space is required to resolve issues associated with various types of entities, such as corporate, non-profit, public, private, government, etc.

Examples of such digital space issues include attack surface management and security operations, third-party risk assessment, due diligence assessment (e.g., related to employees, customers, vendors, partners, acquisitions or potential acquisitions, etc.), brand reputation, social media exposure, and/or other similar issues. In some embodiments, assessments may be generated in real-time and/or continuous monitoring be performed.

Existing solutions typically cache data, resulting in stale or incorrect assessment information. In addition, existing solutions gather excessive amounts of data and require additional resources to filter and present the data. Assessments provided by such solutions are irrelevant and out-of-context, and still require additional resources for further analysis to prove or disprove findings, claims, etc. Currently, all of the required information to address problems with digital presence are scattered and/or are collected and/or presented within siloed solutions. Existing solutions only collect and present a fraction of the data and analysis required to solve digital presence issues and problems.

The assessment engine of some embodiments provides dedicated and focused assessments of digital presence risk mitigation and threats. The assessment engine uses a proven, repeatable, and scalable discovery and assessment methodology. Assessed threat arenas may include technical, strategic, operational, and financial. The assessment engine may provide a point-in-time "snapshot" facility that empowers users with an on-demand, targeted, and configurable way to discover and identify digital presence issues based on their requirements. A guided investigation facility may allow users of all technical levels and functions to discover and harvest all the required and relevant data using digital presence investigation modules and sub-modules, configurable settings, knowledgebase articles, etc.

The assessment engine provides an on-demand facility that can provide a digital presence assessment of risks and exposures in a business context (e.g., technical, strategic, operational, and financial) of all related organizations and entities. The assessment engine may provide a "single-pane-of-glass" holistic view of a subject organization, partners, third parties (e.g., competitors), vendors or other supply chain resources, and/or other relevant categories. An immediate digital presence "state-of-affairs" may be provided with the data available in adaptable and applicable form factors, viewable by all interested parties, and shared or integrated with existing enterprise solutions.

Assessment categories (and associated assessment resources) may include information related to domains, sub-domains, certificates, cloud infrastructure, public code repositories, social media profiles, dark web content, archived websites, etc.

The assessment engine may continuously monitor a subject organization, third parties, vendors, and partners using the same type(s) of data. The assessment engine may provide an adversarial view of assets and exposure, with associated granular and contextual information. The same information and techniques used by automated testers (e.g., pentesters), adversaries, and bug bounty hunters may be used to provide proactive assistance in reducing technical, operational, strategic, and financial risk. The assessment engine may evaluate cloud presence on all major cloud vendor platforms related to storage, applications, databases, etc. The assessment engine may allow users to review public code repository exposures. The assessment engine may allow users to evaluate business risks and other pertinent information for a holistic view of an organization by monitoring a public company's financial statements and ownership trends, viewing current and/or closed litigation, layoff information and rumors, negative and general news, and/or other relevant assessment data. The assessment engine may provide a dark web platform ("darcache") for viewing contextual dark web data with an easy-to-use interface that takes the risk out of connecting to the dark web using a software as a service (SaaS)-based platform and allows users to search through dark web URLs and view the associated content in full contextual, sanitized form.

The assessment engine may allow for highly configurable data discovery and analysis settings for an organization and/or third parties of interest. The assessment engine may provide an easy to use and navigate interface for configuring data collection and result presentation. No technical skills are required to execute data discovery and result generation. Interpretation of information may be performed using a comprehensive knowledge base within the platform. Such an approach may bridge the gap between technical and non-technical speak through correlation of knowledge-base and results.

FIG. 1 illustrates an example overview of one or more embodiments described herein, in which an assessment engine 100 receives an assessment query 110 and generates a threat assessment 120. In this example, assessment engine 100 includes a context filter 130 and extraction interface 140 that is able to interact with a set of assessment resources 150 including a legal resource 160, a domain resource 170, and a business resource 180.

Assessment engine 100 may be accessible via an application programming interface (API), web portal, and/or other appropriate resource. In some embodiments, assessment engine 100 (or elements thereof) may be implemented at or provided by a user device such as a smartphone, laptop, tablet, personal computer, etc. In some embodiments, assessment engine 100 (or elements thereof) may be implemented at or provided by a device or set of devices such as a server and/or storage.

As shown, assessment engine 100 may receive an assessment query 110. The assessment query 110 may be received from a client via a web browser, application, or other appropriate resource using an input interface (not shown) or other appropriate element of the assessment engine 100. Throughout this disclosure, a "client" or "client user" may refer to a person that accesses the assessment engine 100 through a user interface (UI), an application or other automated entity, an API or other interface, and/or any other type of entity that is able to provide an assessment query 110 to the assessment engine 100. The assessment query 110 may be text-based and/or may include other types of media (e.g., audio, photographic, video, etc.). Assessment query 110 may include elements such as names or other biographical information, keyword(s), logos, brand names, profile pictures, etc. In this example, the assessment query 110 includes a uniform resource locator (URL) address associated with a web page or web site ("threatng.com").

The assessment query 110 may be received and analyzed by context filter 130. The context filter 130 may be able to analyze received assessment queries 110 in various appropriate ways and with respect to various appropriate models or profiles (e.g., client profiles, category profiles, resource profiles, etc.). The context filter 130 may, for example, determine whether the received assessment query 110 is associated with a URL by determining whether any of a set of specified text strings (e.g., ".com", ".org", ".gov", etc.) associated with a URL profile is included in the assessment query 110. As another example, the context filter 130 may determine whether the assessment query 110 is associated with a business by determining whether any of another set of specified text strings (e.g., "corporation", "inc.", "LLC", etc.) associated with a business profile is included in the assessment query 110. Such analysis may be used to associate received assessment queries with various other entity types or attribute types (e.g., government agency, individual, name, region, brand, etc.). As another example, artificial intelligence and/machine learning may be used to analyze received queries and match to one or more profile types. For instance, a text phrase may be analyzed and associated with a patent title profile based on inclusion of words such as "system" or "method".

The context filter 130 may utilize resources such as search engines, public databases, etc. to identify relevant text strings, keywords, etc. For instance, if the assessment query 110 includes a URL, or portion thereof, such as "threatng.com", any web site or other information available via the URL may be used to extract relevant text strings, keywords, etc. As another example, portions of a submitted assessment query 110 (e.g., "threatng" in this example) may be provided to a search engine to identify relevant sites or information. Information received in an assessment query may be augmented or modified in various ways to help identify relevant resources, keywords, search terms, etc. For instance, if an assessment query including "threatng corporation" is received, terms such as "threatng inc.", "threatng company", etc. may be utilized to search for relevant information and/or resources. As another example, a name such as "threatng" may be divided into sections (e.g., "threat" and "ng") and the sections may be used to search for relevant information and/or resources.

The context filter 130 may identify relevant assessment attributes and select assessment resources via the extraction interface 140. The assessment resources 150 may be accessed via one or more networks, APIs, and/or other appropriate elements. The extraction interface 140 may manage messaging and/or other communication protocols as necessary to request and receive data from the various resources in the set of assessment resources 150. Each assessment attribute may be mapped to a "category" that is associated with one or more specific resources from the set of assessment resources 150 (e.g., a domain category that is associated with the domain resource 170). The set of categories (and associated set of assessment resources 150) may be limited or pre-filtered to a manageable number (e.g., five, ten, twelve, etc.) such that relevant information is able to be provided via a single assessment 120 (and/or associated UI 190).

In this example, the assessment attribute may be identified as the domain URL ("threatng.com") and the assessment resource may be domain resource 170. Such a domain resource 170 may be a domain registrar, domain search resource, and/or other appropriate domain resource. Assessment data related to the identified assessment attributes may be extracted from the domain resource 170 via the extraction interface 140, and passed to the context filter 130. In this example, the extracted information includes the domain owner and host.

Assessment data may be extracted from the resources 150 in various appropriate ways, depending on various relevant factors (e.g., resource type, interface type, query components, etc.). For instance, an assessment request message may be generated by the extraction interface 140 based on information received from the context filter 130, the assessment request message may be sent to the appropriate resource 150 via an API, and a response may be received. The assessment data may be specifically requested (e.g., a request for the owner of a domain) and/or a generic request may be made (e.g., by requesting all available information related to the domain URL). Multiple sets of messages may be sent in each assessment request message. Assessment request messages (and/or other types of requests) may be generated and/or formatted in various appropriate ways based on various relevant factors, such as resource type, content of an assessment query 110, etc. For instance, if a received query 110 includes a term such as "threatng.com", an assessment request message to the domain resource 170 may include the more generic term "threatng" such that additional domains may be identified.

The context filter 130 may receive, analyze, and/or filter the extracted assessment data. Such analysis may include identification of additional assessment attributes and associated assessment resources. For instance, in this example, the owner of the domain may be indicated as being "ThreatNG Inc.", where the context filter 130 may identify the information as indicating a business name, and send a request for assessment data to the business resource 180. Such a request may return assessment data such as business type, state of registration, ownership, management, etc. The context filter 130 may analyze the extracted assessment data to identify relevant entities associated with the business and use such information to identify any pending litigation associated with the relevant entities via the legal resource 160 (e.g., one or more sets of court electronic records). For example, each officer of the company may be compared to listings of plaintiffs and defendants in pending litigation in a set of relevant jurisdictions.

The context filter 130 may filter extracted information based on various relevant factors, such as profile information (e.g., client profiles, category profiles, resource profiles, report profiles, etc.). For instance, if a client profile is associated with a financial services professional, context filter 130 may exclude data related to hosting or other non-financial information. As another example, if a client profile is associated with in information technology professional, context filter 130 may include additional information related to hosting services or other technical information that may not be relevant to other types of client profiles.

As another example, once the domain owner has been identified, the owner information may be used to generate an assessment request message including the entity name, where the assessment request message may be sent to the domain resource 170 in order to extract a listing of other domains owned by the entity.

As still another example, if a relevant domain has been identified, the domain information may be used to generate an assessment request message including the domain, where the assessment request message may be sent to the domain resource 170 in order to extract a listing of sub-domains associated with the domain.

The context filter 130 and extraction interface 140 may perform any number of identification and extraction cycles, depending on various relevant factors such as user preferences, default settings, analysis of extracted information, etc.

The context filter 130 may utilize the extracted assessment data to generate a threat assessment 120 (and/or other types of assessments, reports, etc.). Such a threat assessment 120 may be generated on-demand, at regular intervals, and/or upon satisfaction of various specified criteria. The threat assessment 120 may allow for continuous monitoring of an organization's digital and social presence.

In this example, the threat assessment 120 may be presented via a UI 190 that includes a listing of various topics or headings that may be expanded to provide sub-topics, data elements, etc. The threat assessment 120 (and/or UI 190) may be formatted or presented in various appropriate ways and may include various headings, graphical elements, navigation features, etc., as appropriate. UI 190 may be provided via a web browser, application, and/or other appropriate resource. In some embodiments, the threat assessment 120 may be provided as a set of data elements or other non-interactive report type (e.g., a summary table).

Feedback may be received similarly to the assessment query 110 and may be utilized by the context filter 130 to update the threat assessment 120 and/or any UI 190 associated therewith. For instance, selections may be received from a user indicating that the user is only interested in assessment information associated with litigation. As another example, if a user selects a particular competitor from a list included in UI 190, the competitor business name may be used as an assessment attribute to extract additional information related to the competitor and update the assessment 120, for example by retrieving a listing of officers associated with the competitor business.

Feedback and configuration information may be associated with assessment resource types or attributes, depth of analysis (e.g., whether analysis should be limited to a corporate entity or if officers of the corporate entity should also be analyzed), arrangement or content of UI 190, and/or other appropriate parameters or attributes associated with assessment engine 100. Configuration information may be utilized to run automated assessment and/or provide continuous or near-continuous monitoring of entities. For instance, an assessment query 110 may be associated with a report type or template and the report may be generated at regular intervals and/or based on some specified criteria.

Some embodiments may include a set of assessment resources 150 associated with a set of specified categories (e.g., open-source intelligence (OSINT) top 10, company information, technical information, operational information, strategic information, financial information, etc.), where the specified categories may be specified by default, associated with various reporting templates or assessment query types, user preference, available information, etc. UI 190 may provide a "single-pane-of-glass" holistic view of, for example, an organization, partners, third parties, and supply chain via the threat assessment 120. The point-in-time "snapshot" facility empowers users with an on-demand, targeted, and configurable way to discover and identify digital presence issues based on their requirements. The guided investigation facility allows users of all technical levels and functions to discover and harvest all the required and relevant data through digital presence investigation modules and sub-modules, configurable settings, knowledgebase articles, etc. Threat assessment 120 may provide an immediate digital presence "state-of-affairs" with the data available in adaptable and applicable form factors, viewable by all interested parties, and able to be shared and/or integrated with existing enterprise solutions.

In some embodiments, the assessment engine 100 may generate one or more assessment scores or metrics. For instance, some embodiments may generate a risk metric indicating a relative level of risk from zero to one hundred percent. Other example metrics may include, for instance, digital exposure, overall reputation, brand reputation, etc. In some embodiments, the assessment engine 100 may generate a combined metric or score based on a set of metrics or scores (e.g., by averaging a set of risk metrics, by calculating a weighted average across various types of risk, etc.). The assessment metrics or scores may be used by some embodiments to initiate and/or implement various actions or responses. For instance, if a risk exposure metric exceeds a threshold, public access to an associated server may be restricted. As another, example, if a brand reputation score falls below a threshold, advertising associated with the brand may be suspended pending review.

Figure 2:
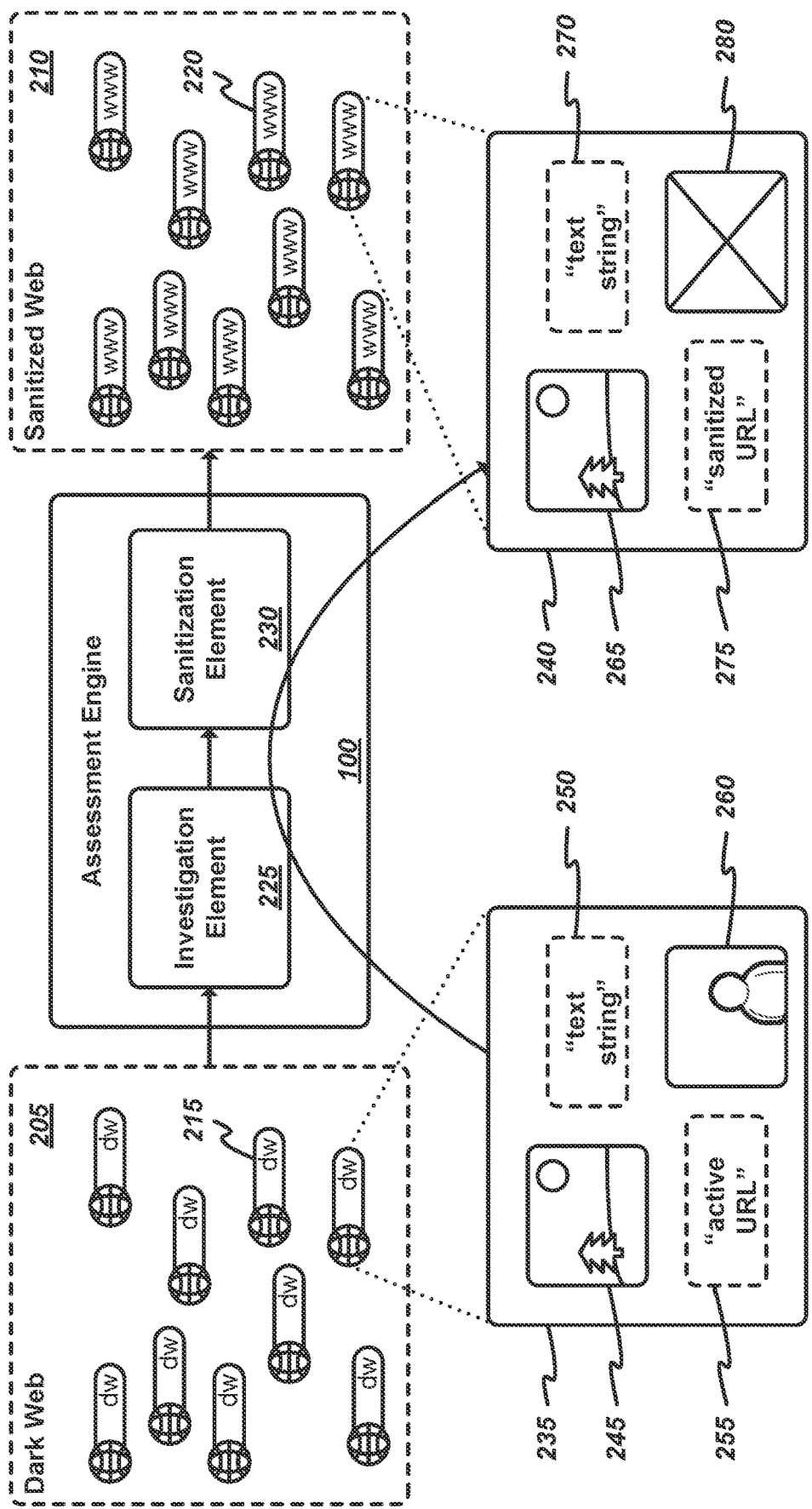
FIG. 2 illustrates an example overview of one or more embodiments described herein, in which a set of dark web sites are identified and sanitized by the assessment engine.

FIG. 2 illustrates an example overview of one or more embodiments described herein, in which a set of dark web sites 205 are identified and sanitized by assessment engine 100 to generate a set of sanitized web sites 210. As shown, a set of dark web sites 205 may be processed by assessment engine 100. The set of dark web sites 205 may be associated with an entity being assessed, with each other (e.g., via URL links), and/or otherwise associated with an assessment. Each individual dark web site 215 may be associated with a unique address, page, or other appropriate element.

Each of the dark web sites 215 may be identified and received by investigation element 225. Investigation element 225 may identify any number of dark web sites 215 to include in the set 205. Sites may be identified in various appropriate ways, such as text string or keywork matching, association with brand names or branded items for sale, and/or other appropriate ways based on various appropriate factors. For instance, in some cases an assessment query 110 may include a reference to a dark web site 215 or page address. Each dark web site 215 may be analyzed to identify links to other deep or dark web sites. Such linked sites may be included in the set of dark web sites 205 to be sanitized.

The investigation element 225 may pass each dark web site 215 to the sanitization element 230 for processing. The sanitization element 230 may process each received dark web site 215 in various appropriate ways and then may save a sanitized copy 220 of each dark web site 215.

Dark web content may be sanitized in various appropriate ways using various appropriate algorithms. For instance, in some embodiments, all embedded or otherwise displayed or provided media (audio, video, graphical, etc.) may be removed or obscured such that inappropriate content is not displayed, provided, or downloaded. As another example, all links (or all dark web links) may be removed or otherwise deactivated such that a client is not exposed to malicious content or software. As another example, inappropriate language, text, or graphics may be removed or obscured.

In some embodiments, various different sanitization filters may be utilized. Such filters may include text elements (e.g., a list of inappropriate words, phrases, etc.), addresses or links (e.g., a listing of known malicious sites), graphic features (e.g., logos associated with disreputable or criminal enterprises), and/or other relevant filters. For instance, photographic images that include people may be obscured or removed from view, while photographic images of landscapes may not be obscured or removed. As another example, URLs associated with malicious content or dark web sites may be removed or deactivated while URLs associated with surface web pages may not be removed or deactivated. As another example, photographic or video content may be analyzed in various ways (e.g., by comparing such content to a set of reference profiles) to determine whether the content should be removed or otherwise sanitized. Different filters may be utilized based on various relevant factors, such as client configuration settings, assessment type (and/or other assessment configuration settings), etc.

In this example, a particular dark web page 235 may be converted to a sanitized copy 240. As shown, the dark web page 235 includes a first image 245, a text string 250, an active URL 255, and a second image 260. This example includes a limited number of elements for clarity, but one of ordinary skill in the art would recognize that dark web page 235 and/or sanitized copy 240 may include any number or arrangement of elements that may be presented via, embedded at, and/or otherwise included in a web page or site.

The first image 245 in this example shows a landscape. The sanitization element 230 may analyze the image to determine whether the image includes inappropriate or disallowed content. In this example, the sanitization element 230 determines that the first image 245 does not include inappropriate or disallowed content and thus the sanitized copy 240 includes a copy 265 of the first image 245.

The text string 250 may be analyzed by comparing portions of the string to one or more sets of elements such as text strings, keywords, etc. If any portion of the text string 250 matches the provided elements, that portion may be removed or obscured. In this example, the sanitization element 230 may determine that the text string 250 does not include any disallowed elements (e.g., by determining that no portion of the string matches any of the provided elements) and the sanitized copy 240 includes a copy 270 of the text string 250.

The active URL 255 may be analyzed to determine whether the URL is associated with a dark web site, and/or whether the URL matches any URL filter criteria. In some embodiments, all active URLs may be deactivated or removed. In this example, the active URL 255 is converted to a sanitized URL 275 such that a client user may evaluate the content without danger of exposure to a questionable URL. In some embodiments, an active URL may be converted to plain text. In some embodiments, the sanitized URL may be modified to point to a sanitized copy 220 from the set of sanitized web sites 210 rather than the original destination such that a client user is able to "browse" among the sanitized web sites 210.

The second image 260 may be analyzed by comparing the image, or portions thereof, to various reference images, profiles, etc. Images may be analyzed in various appropriate ways in order to identify or match content. In this example, the sanitization element 230 may determine that the second image 260 includes a person and the sanitized copy 240 may include a blank section 280 or default image indicating that content was removed. In some embodiments, an image may be partially modified or obscured to eliminate only matching sections while leaving other sections of the image unmodified and/or unobscured.

Similar approaches may be applied to other types of content, such as video, multimedia, audio, vector graphics, etc. Sanitization algorithms, parameters, and attributes may be based on various relevant factors such as client preference, assessment attributes, content type, risk level, etc. For instance, a default setting for a novice user may remove all active links or content from sanitized copies, while an expert user may wish to retain most content and only remove media with certain types of explicit content.

Dark web content may be analyzed and presented for various appropriate assessments. For instance, a software developer may wish to determine the prevalence of unlicensed copies for sale on the dark web (and/or other information, such as sales price, volume, etc.).

Figure 3:
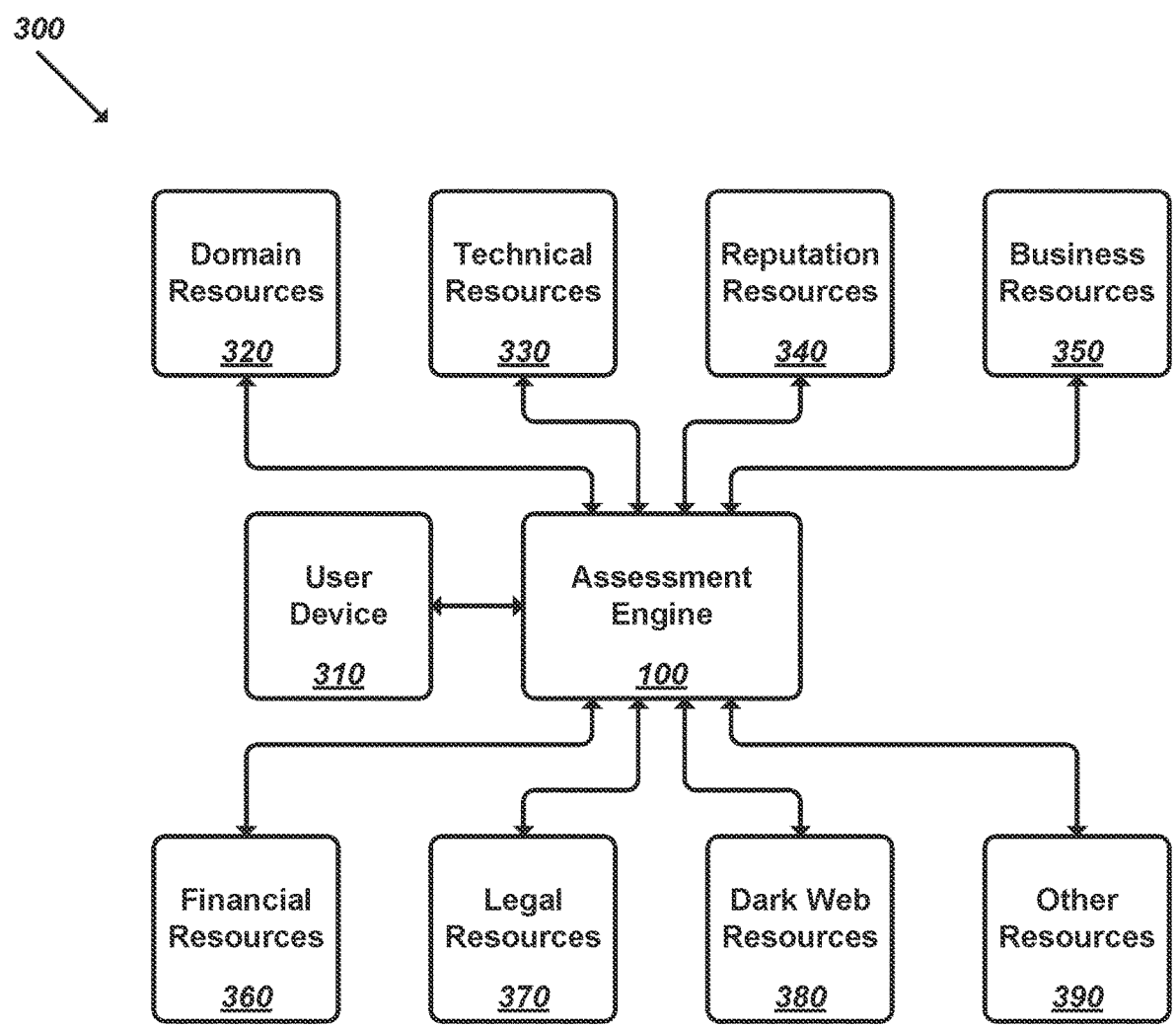
FIG. 3 illustrates a schematic block diagram of an environment associated with one or more embodiments described herein.

FIG. 3 illustrates a schematic block diagram of environment 300 associated with one or more embodiments described herein. As shown, the environment 300 may include a user device 310, an assessment engine 100, and various resources 320-390.

The user device 310 may be a device such a s smartphone, tablet, personal computer, wearable device, etc. The user device 310 may include or provide elements such as, for instance, a web portal, an API, and/or other appropriate interface that is able to receive queries from a user, device, application, and/or other appropriate sources and provide the received queries to the assessment engine 100. The user device 310 may be able to display or provide a threat assessment 120 to a user (e.g., via UI 190) or another resource.

The assessment engine 100 may be implemented using (and/or be otherwise associated with) one or more electronic devices, such as user devices, servers, storages, etc. The assessment engine 100 may include various software components that may utilize or otherwise interact with various local and/or network resources 320-390 (e.g., servers, databases, APIs, and/or other resources available across the Internet or other networks).

The resources 320-390 may include domain resources 320, technical resources 330, reputation resources 340, business resources 350, financial resources 360, legal resources 370, dark web 380, and/or other resources 390. The resources 320-390 may include various individual resources or sets of resources based on factors such as user configuration data, report configuration data, default or template information, external resource listings (e.g., OSINT top 10), available networks or communication pathways, and/or other relevant attributes or parameters. The resources 320-390 may be associated with vetted or otherwise validated information sources. The resources 320-390 may include public and/or private resources (e.g., authentication information such as an account or password may be needed to access the resources).

Resources 320-390 may be implemented by, or accessed via, various sets of electronic devices, interfaces, and/or other components or elements over one or more networks or sets of networks. In some embodiments, the assessment engine 100 may maintain a set of local resources (e.g., the assessment engine 100 may collect resource information from various network resources and store the collected information at a storage associated with the assessment engine 0100). Resources 320-390 may be accessible in real-time (or near real-time), such that an accurate real-time snapshot may be generated based on a received assessment query 100.

Domain resources 320 may include various servers, storages, etc. that may provide domain and/or sub-domain registration information, such as domain owner, primary contact, hosting service, etc. Assessment queries 110 that include terms such as top-level domains (e.g., ".com", ".net", ".org", ".gov", etc.) may be associated with selection of domain resources 320 for data extraction by assessment engine 100. Information received via domain resources 320 may be used to identify and/or select other resources 320-390 and/or automatically generate assessment request messages (and/or other appropriate requests for information). For instance, if domain owner information is received from domain resources 320, that information may be analyzed to identify a company that owns the domain, resulting in selection of business resources 350 using search terms associated with, for instance, the company name. As another example, if domain owner information is received from domain resources 320, additional assessment request messages may be sent to the domain resources 320 requesting other domains owned by the same entity.

Technical resources 330 may include various resources such as patent databases, trademark information, scholarly publications, etc. Assessment queries 110 that include individual or business names, text or phrases associated with, for example, trademarks or patents, and/or other relevant information may be associated with selection of technical resources 330 for data extraction by assessment engine 100. For instance, an assessment query 110 including a term such as "threatng" may be submitted to a technical resource 330 such as a trademark search database to determine whether any relevant marks may be identified. Information received via technical resources 330 may be used to identify and/or select other resources 320-390 and/or automatically generate assessment request messages (and/or other appropriate requests for information). For instance, if patent information is received from technical resources 330, that information may be analyzed to identify a list of inventors, resulting in selection of legal resources 370 using search terms associated with, for instance, the names of the inventors. As another example, if inventor information is received from technical resources 330, additional assessment request messages may be sent to the technical resources 330 requesting other patents associated with the inventor(s).

Reputation resources 340 may include resources such as rating or review websites, professional network sites, etc. Assessment queries 110 that include brand names or business names and/or other relevant information may be associated with selection of reputation resources 340 for data extraction by assessment engine 100. For instance, an assessment query 110 including a component such as "ThreatNG Inc." may be submitted to a reputation resource 340 such as a consumer review web site to determine whether any relevant listings may be identified. Information received via reputation resources 340 may be used to identify and/or select other resources 320-390 and/or automatically generate assessment request messages (and/or other appropriate requests for information). For instance, if review information is received from reputation resources 340, that information may be analyzed to identify a brand name, resulting in selection of technical resources 330 using search terms associated with, for instance, the brand name.

Business resources 350 may include resources related to business registration (e.g., a secretary of state database associated with corporate registrations), public filings, etc. Assessment queries 110 that include business names and/or other relevant information may be associated with selection of business resources 350 for data extraction by assessment engine 100. For instance, an assessment query 110 including a component such as "ThreatNG Inc." may be submitted to a business resource 350 such as a set of secretary of state business registration databases to determine whether any relevant listings may be identified. Information received via business resources 350 may be used to identify and/or select other resources 320-390 and/or automatically generate assessment request messages (and/or other appropriate requests for information). For instance, if ownership or management information is received from business resources 350, that information may be analyzed to identify one or more individuals, resulting in selection of reputation resources 340 and/or legal resources 370 using search terms associated with, for instance, the individuals' names. As another example, if owner or officer information is received from business resources 350, additional assessment request messages may be sent to the business resources 350 requesting other businesses associated with the same owners or officers.

Financial resources 360 may include financial information disclosed to various reporting bodies, stock price information, filings for publicly traded companies, etc. Assessment queries 110 that include business names and/or other relevant information may be associated with selection of financial resources 360 for data extraction by assessment engine 100. For instance, an assessment query 110 including a component such as "AMZN" may be submitted to a financial resource 360 such as a stock price database to determine whether any relevant listings may be identified. Information received via financial resources 360 may be used to identify and/or select other resources 320-390 and/or automatically generate assessment request messages (and/or other appropriate requests for information). For instance, if stock information is received from financial resources 360, that information may be analyzed to identify one or more corporate entities, resulting in selection of business resources 350 and/or legal resources 370 using search terms associated with, for instance, the corporate entity names. As another example, if a listing of associated or similar stocks is received from financial resources 360, additional assessment request messages may be sent to the financial resources 360 requesting information associated with the stocks.

Legal resources 370 may include information related to court cases, legal filings, etc. Assessment queries 110 that include individual or business names and/or other relevant information may be associated with selection of legal resources 370 for data extraction by assessment engine 100. For instance, an assessment query 110 including a component such as "James Johnson" may be submitted to a legal resource 370 such as a court electronic record database to determine whether any relevant filings may be identified. Information received via legal resources 370 may be used to identify and/or select other resources 320-390 and/or automatically generate assessment request messages (and/or other appropriate requests for information). For instance, if litigation information is received from legal resources 370, that information may be analyzed to identify one or more opposing corporate defendants or plaintiffs, resulting in selection of business resources 350 using search terms associated with, for instance, corporate entity names. As another example, if a listing of pending litigation is received from legal resources 370, additional assessment request messages may be sent to the legal resources 370 requesting information associated with the other litigants (e.g., additional lawsuits or other filings).

Dark web resources 380 may include web content that is not indexed by search engines and/or otherwise requires specific software, configurations, or authorization to access (typically referred to as the "dark web" or "deep web"). Dark web resources 380 may be identified, evaluated, and sanitized by assessment engine 100 such that user devices 310 are not exposed to malicious, inappropriate, or illegal content. As described above, dark web resources 380 may include a set of navigable, sanitized web sites 210 generated and/or provided by assessment engine 100. Assessment queries 110 that include dark web addresses and/or other relevant information may be associated with selection of dark web resources 380 for data extraction by assessment engine 100. For instance, an assessment query 110 including a component such as "threatng.onion" may be submitted to a dark web resource 380 such as a database of sanitized web sites 210, application, and/or other appropriate dark web interface to determine whether any relevant listings may be identified. Information received via dark web resources 380 may be used to identify and/or select other resources 320-390 and/or automatically generate assessment request messages (and/or other appropriate requests for information). For instance, if information related to sales of branded items is received from dark web resources 380, that information may be analyzed to identify one or more brand names, resulting in selection of technical resources 330 using search terms associated with, for instance, the brand names. As another example, if a listing of associated or linked dark web sites is received from dark web resources 380, additional assessment request messages may be sent to the dark web resources 380 requesting information associated with the other sites.

Other resources 390 may include various other public databases, such as news sources or aggregation services, search engine resources, social media platforms, school or university records, local government records, etc. Assessment queries 110 that include unknown types of elements (e.g., text strings that do not match any filters) and/or other relevant information may be associated with selection of other resources 390 for data extraction by assessment engine 100. For instance, an assessment query 110 including a component such as "once upon a midnight dreary" may be submitted to an other resource 390 such as a search engine to determine whether any relevant results may be identified. Information received via other resources 390 may be used to identify and/or select other resources 320-390 and/or automatically generate assessment request messages (and/or other appropriate requests for information). For instance, if an author name is received from other resources 390, that information may be used to select technical resources 330 using search terms associated with, for instance, the author name in order to identify copyrights or trademarks associated with the author. As another example, if a listing of related search terms is received from other resources 390, additional assessment request messages may be sent to the other resources 390 requesting information associated with the related search terms.

FIG. 4 illustrates a data structure diagram 400 of one or more embodiments described herein, in which various profiles 410-430 are used to define and select assessment elements and features. In this example, the set of profiles includes a category profile 410, a client profile 420, and a report profile 430. Different embodiments may include various different types of profiles associated with various different sets of elements. For instance, some embodiments may include one or more resource profiles associated with one or more resources 320-390.

As shown, the category profile 410 may include elements such as a unique identifier, a listing of associated resources, evaluation criteria, a listing of sub-categories or associated categories, and a set of associated profiles. The listing of resources may include, for instance, resource identifiers, names, etc. that may be used to identify one or more resources 320-390 associated with a category. For instance, a "domain" category profile 410 may be associated with domain resources 320, dark web resources 380, and/or other such resources. Evaluation criteria may include information such as lookup tables, keywords, terms, models, etc. For instance, evaluation criteria associated with a "business" category profile 410 may include matching terms such as "company", "incorporated", "inc.", "LLC", etc. Sub-categories or associated categories may include, for instance, names or identifiers of other category profiles 410. Associated profiles may include one or more listings of associated profile types, profiles, etc. For instance, a category profile 410 may be associated with a default report profile 430 such that an assessment query 110 that is determined by the assessment engine 100 to be associated with a category profile 410 may be presented in a relevant and appropriate way. For instance, if an assessment query 110 is determined by the assessment engine 100 to include a business name, a "business" category profile 410 may be selected and any assessment data may be presented using an associated "business" report profile 430 that includes categories associated with businesses arranged in an appropriate configuration, while an assessment query 410 that is determined to include a domain may be associated with a "domain" category profile 410 and associated "domain" report profile 430.

As shown, the client profile 420 may include elements such as a unique identifier, configuration settings, and a set of associated profiles. Configuration settings may include elements such as intervals and/or other triggers for periodic report generation, assessment weightings for various categories, client-specific algorithms for determination of assessment attributes, client-specific matching terms or criteria, etc. Associated profiles may include names or identifiers of profiles such as default or preferred reports, sets of associated categories, etc.

As shown, the report profile 430 may include elements such as a unique identifier, assessment attributes, a listing of associated category identifiers, selection criteria, configuration settings, and a set of associated profiles. Assessment attributes may include, for instance, an assessment query 110, assessment request message elements, and/or similar attributes that may be used to automatically generate a report using the report profile 430. Category identifiers may include listings, arrangements, and/or other configuration information related to categories for display in a report. Selection criteria may include various attributes and/or algorithms that may be used to determine whether a report profile 430 should be selected based on a received assessment query 110 and/or other relevant factors. For instance, a default "domain" report profile 430 may be associated with selection criteria such as matching terms ".com", ".org", etc. Configuration settings may include information such as listings of headings, sub-headings, display arrangements, UI elements, and/or other information related to presentation and/or generation of reports. Associated profiles may include names or identifiers of profiles such as associated client profiles 420, related report profiles 430, etc.

One of ordinary skill in the art will recognize that various other profile types including various elements may be included with, utilized by, and/or otherwise associated with the assessment engine 100 of some embodiments. For instance, report profiles 430 may be individually configurable by client users such that a client user may be provided with only the information of interest for a given assessment query 110. Assessment queries 110 used to generate ongoing or periodic snapshots of digital presence may be associated with various specific profiles, and/or be defined using an assessment profile (not shown).

Figure 5:
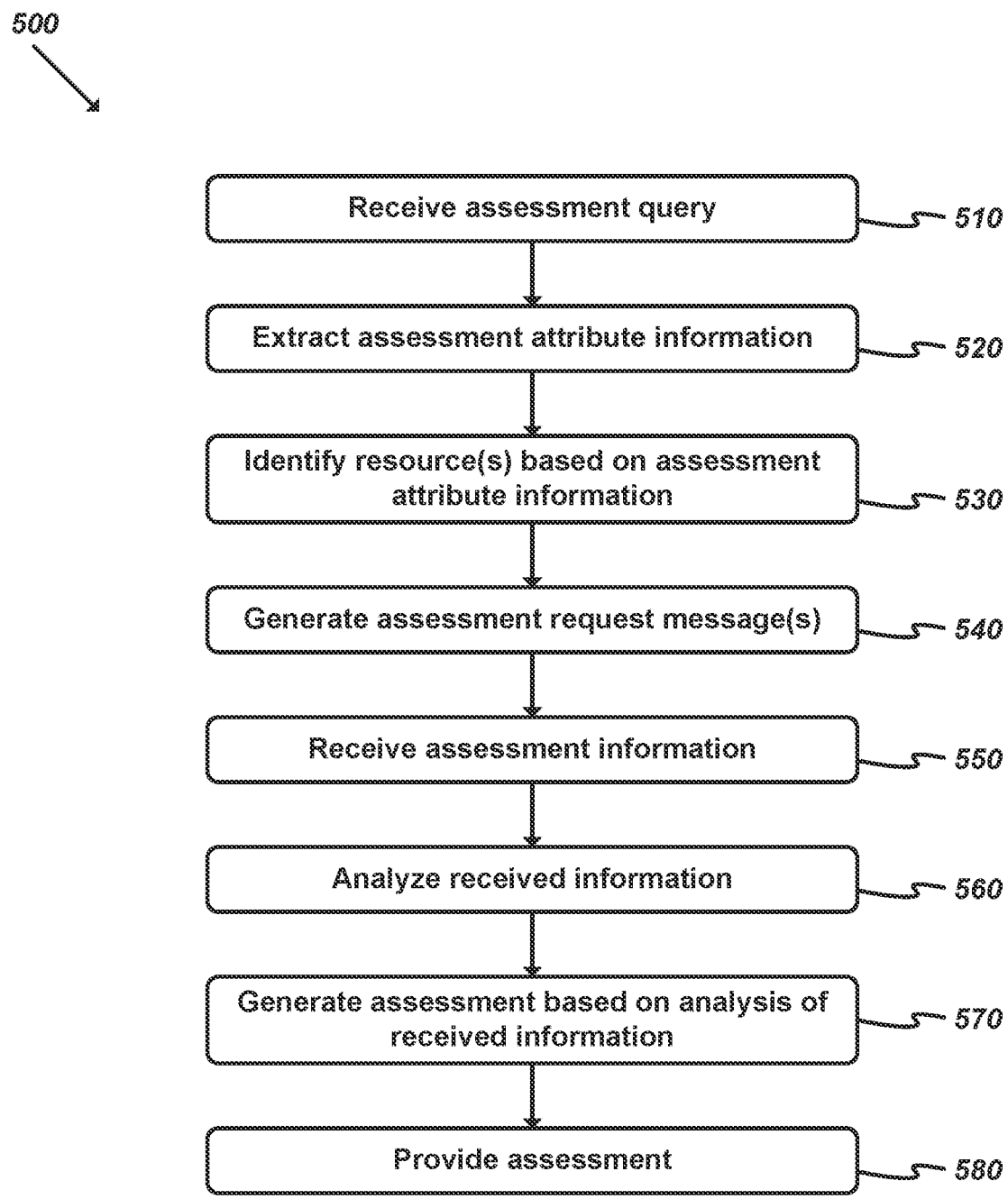
FIG. 5 illustrates a flow chart of an exemplary process that generates an assessment report based on a received query.

FIG. 5 illustrates an example process 500 for generating an assessment report based on a received query. Process 500 allows client users of various levels of expertise to extract relevant real-time information related to digital presence and present the information in a coherent, intuitive way. The process may be performed when a client user accesses a web portal or application of some embodiments. In some embodiments, process 500 may be performed by assessment engine 100.

As shown, process 500 may receive (at 510) an assessment query. The assessment query may be similar to assessment query 110. Such an assessment query may include, for instance, a trigger such as one or more URL addresses, entity names, names of individuals, sets of keywords, etc. The assessment query may generally be used to identify a target for assessment, whether the assessment target is an individual, corporation, other entity type, or an unknown entity (e.g., an assessment based on a URL may not be initially associated with a specific entity, with the entity being identified through generation of the assessment). The assessment query may be received at assessment engine 100 from a user device 310 or other appropriate resource via an API and/or some other appropriate channel(s). For automated or periodic assessments, the assessment query may be retrieved from a storage via a structure such as a report profile 430.

Process 500 may extract (at 520) assessment attribute (or "trigger") information. The assessment attribute information may be extracted by analyzing the assessment query to identify relevant data. Some queries may include multiple assessment attributes (e.g., a domain or subdomain and an associated company or brand name, multiple keywords, etc.).

Process 500 may identify (at 530) one or more resources based on the assessment attribute(s). Such resources may include elements such as resources 320-390 described above. Appropriate resources may be identified based on factors such as term or keyword matching, client configuration profiles, etc. Depending on the identified assessment attributes, different resources may be identified or utilized. For instance, if the assessment attribute is associated with a corporation traded on a public exchange, information may be received from many types of resources. In contrast, if the assessment attribute is associated with an individual, information may only be available from a limited set of resources.

The process may generate (at 540) a set of assessment request messages (and/or otherwise request or extract assessment information). The assessment request message(s) may be formatted appropriately for the identified resource(s), for example based on information extracted from a resource profile.

Process 500 may receive (at 550) assessment information from the various resources, such as information described above in reference to resources 320-390. Information may be received across various networks or other communication channels using various appropriate protocols.

The process may analyze (at 560) the received information to identify relevant information, additional or alternative assessment attributes, additional or alternative resources, etc. Operations 520-560 may be performed iteratively, as assessment information is received and additional or alternative assessment attributes are identified.

For example, in some embodiments, an entity may be identified in various appropriate ways depending on the assessment query and the assessment attributes. For instance, if a domain is provided, the owner of the domain may be identified as an entity. As another example, if a business name or brand name is provided, a parent corporation may be identified, if applicable and/or relevant.

The process may identify individuals associated with the entity or entities. In some cases, the entity may be an individual. Other individuals may be identified based on analysis of various appropriate resources, such as contact information associated with a domain registration, officer information associated with a corporate statement, etc. In some embodiments, the process may identify other entities associated with any individuals.

Such an approach may be applied across multiple resources, using various assessment attributes and messaging or communication platforms, as information is received from the various resources and analyzed.

The process may generate (at 570) an assessment based on analysis of the received information and/or other appropriate criteria (e.g., client profile, category profiles, report profiles, etc.). Such an assessment may include tabulating and listing retrieved information. For instance, a table may show number of lawsuits as plaintiff and/or defendant over some time period. As another example, quarterly income for a corporation may be provided over some time period.

The assessment may include correlation among different data sources. Thus, information related to a single domain or other entity may include officer information, corporate information, legal information, financial information, etc. Further, the correlated data may be parsed such that relevant elements may be associated or otherwise utilized.

The assessment may be based at least partly on various user selections or preferences. For instance, a financial analyst may have relatively more interest in financial information than legal filings. In contrast, a corporate counsel may have relatively more interest in legal filings than in financial information or reputation information.

Process 500 may provide (at 580) the generated assessment. Providing the assessment may include formatting the information received from the various resources for presentation to a user (or provision to a resource such as an application or API), such as by selecting a report profile 430. Providing the assessment may include generating a "pane of glass" display report that includes all relevant information related to the query. Such a display or interface may be provided via user device 310. The interface may include various selectable elements (e.g., hyperlinks, expansion tabs, etc.).

The report may include various expandable elements related to the assessment. Examples of such elements include "subdomain information", "search engine information", "stock quote information", "layoff history", and "social chatter". When expanded, each tab may include various appropriate listings of relevant information or information sources. Such listings may include "clickable" links or buttons that lead to source data or other appropriate resources. Different relevant information may be provided for various different data types. For instance, stock information may include current price, average volume, yearly high, yearly low, etc. As another example, social chatter may include data including a number of "likes" or retweets associated with material posted on social media accounts related to the assessment target.

Figure 6:
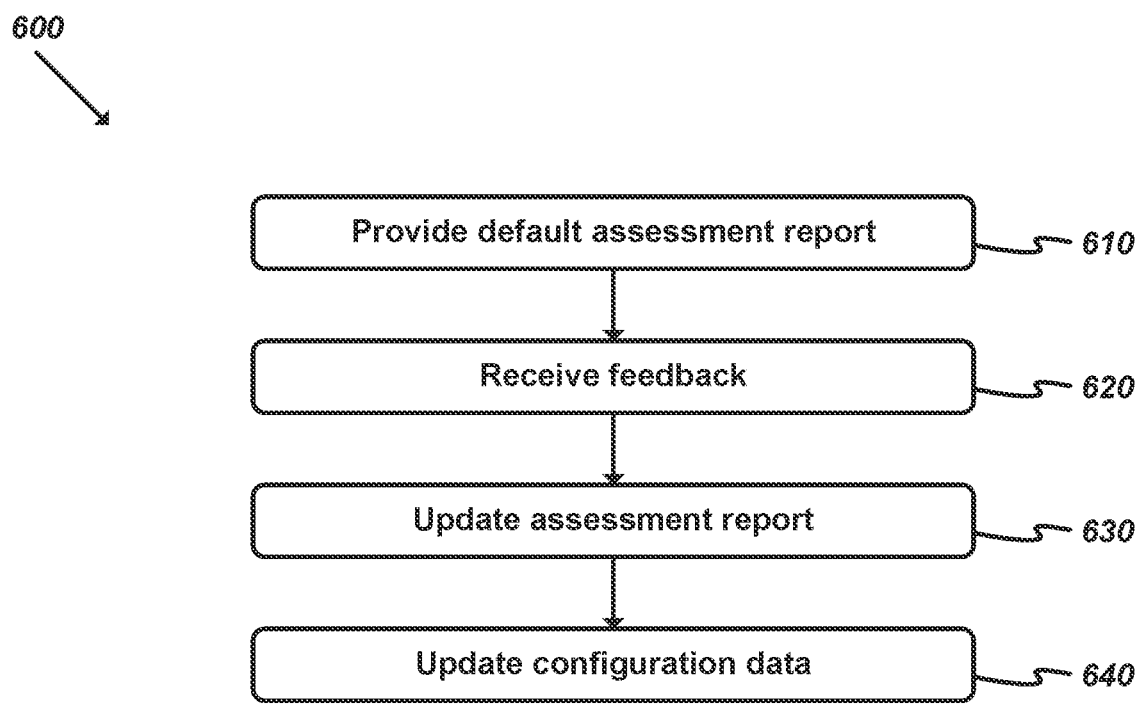
FIG. 6 illustrates a flow chart of an exemplary process that configures an assessment and associated assessment report.

FIG. 6 illustrates an example process 600 for configuring an assessment and associated assessment report. Such a process may be used to tailor a user experience and/or to update various configuration profiles or parameters. The process may be performed when an assessment query is received, when a scheduled assessment is executed, and/or under other appropriate conditions. In some embodiments, process 600 may be performed by assessment engine 100.

As shown, process 600 may include providing (at 610) a default assessment report. The default report may be selected based on various relevant factors, such as client user information, assessment subject information, available resources, assessment information, etc. Assessment reports may typically be associated with ten or fewer categories, such that a client user is able to easily view and interact with the report via a single pane-of-glass UI.

Process 600 may include receiving (at 620) feedback based on the assessment report. Such feedback may include direct and/or indirect feedback. Such feedback may include feedback related to report selection, category selection, arrangement of elements, and/or other relevant attributes of the assessment report.

The process may include updating (at 630) the assessment report based on the received feedback. In some cases, updating the assessment report may include selection of a different report template.

For instance, indirect feedback may include a selection (or non-selection) of a particular category (or other link or content) by a client user. In such cases, a selected category may be weighted more heavily in future assessments while a non-selected category may be weighted less heavily. As another example, selected categories may be moved to location nearer the top of the assessment report, while unselected categories may be moved to a location nearer the bottom of the assessment report (and/or be replace by other categories). Direct feedback may include a client user selecting report template, indicating a preferred order of categories, selecting available categories for inclusion (or removal), and/or similar feedback.

Received feedback may be applied to any aspect of the assessment engine 100. For instance, a client user may provide client-specific and/or subject-specific resources, such as private sales information resources, industry-specific reputation sources, etc.

Updating the assessment report may include extraction, analysis, and/or presentation of additional assessment information in some cases. For example, if a new category is added, assessment data related to the category may be extracted and presented.

As shown, process 600 may include updating (at 640) configuration data based on the received feedback. Such configuration data may include category profiles 410, client profiles 420, report profiles 430, resource profiles, and/or other types of profiles or configuration data.

In some embodiments, feedback from multiple users, organizations, etc. may be collected and applied to various default profiles, templates, reports, etc. For instance, if a particular category is selected by only a small percentage of users, the category profile 410 may be deleted or disassociated from one or more other profiles (e.g., a report profile 430). As another example, if many users manually add a new resource or category, such a resource or category may be made available to other users or included in one or more default templates.

Figure 7:
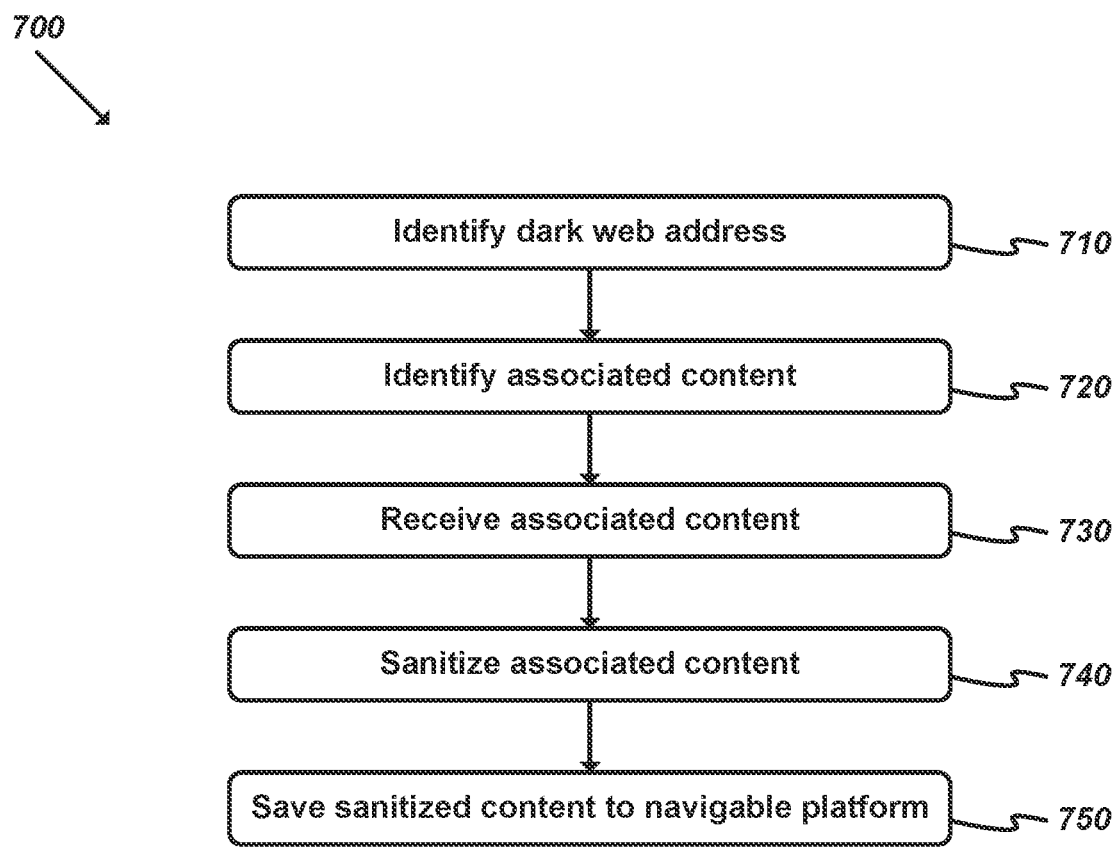
FIG. 7 illustrates a flow chart of an exemplary process that generates a navigable, sanitized platform based on dark web content.

FIG. 7 illustrates an example process 700 for generating a navigable, sanitized platform based on dark web content. Such a process may retain information received from dark web sources without exposing users (or user devices) to unfiltered dark web content. The process may be performed when relevant dark web content is identified as relevant to an assessment, when previously identified dark web content is updated, and/or under other appropriate circumstances. In some embodiments, process 700 may be performed by assessment engine 100.

As shown, process 700 may include identifying (at 710) at least one dark web address. Such an address may be identified in various appropriate ways. An administrator user may utilize applications, search resources, community discussion groups, and/or other resources to identify such addressed. As another example, a client user may provide one or more dark web addresses known to be associated with counterfeit software or other products.

Process 700 may include identifying (at 720) associated content. Identifying associated content may include scanning or otherwise evaluating the dark web address(es) identified at 710. Such associated content may include, for instance, text, images, graphics, multimedia, audio, etc. Associated content may further include links to other dark web addresses or content.

The process may include receiving (at 730) associated content. Content may be received using dedicated applications, browsers, and/or other appropriate resources.

As shown, process 700 may include sanitizing (at 740) associated content. Content may be sanitized in various appropriate ways and based on various appropriate filters or criteria. For instance, as described above, multimedia such as images may be automatically removed or obscured. Some embodiments may evaluate such multimedia to determine whether the content matches some filter parameters in order to determine how the content should be sanitized. As another example, links or addresses may be sanitized by mapping the links or addresses to a sanitized content link or address.

Process 700 may include saving (at 750) the sanitized content to a navigable platform. The sanitized content may be saved in a format that is accessible to a standard web browser or other appropriate resource and may be saved to a resource such as a server or storage that is network accessible.

Figure 8:
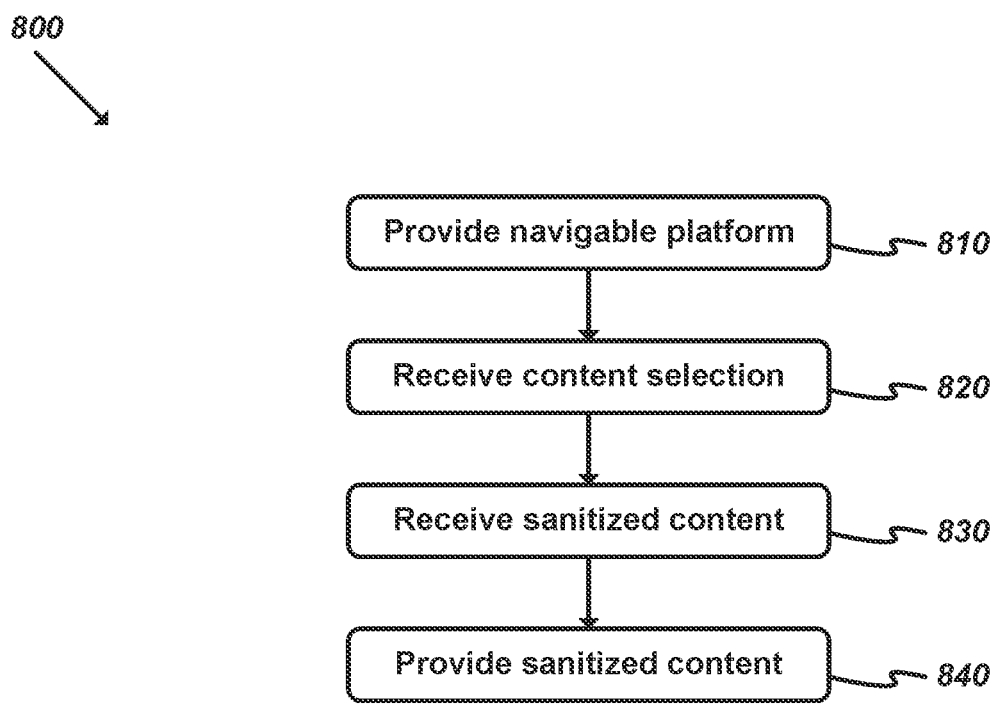
FIG. 8 illustrates a flow chart of an exemplary process that provides a navigable, sanitized platform.

FIG. 8 illustrates an example process 800 for providing navigable, sanitized, dark web content. Such a navigable, sanitized platform may allow client users to evaluate dark web content without risk of exposure to malicious or inappropriate content. The process may be performed whenever updated sanitized content is saved or otherwise made available. In some embodiments, process 800 may be performed by assessment engine 100.

As shown, process 800 may include providing (at 810) a navigable platform. Such a platform may be provided via a set of servers, storages, etc. The navigable platform may be provided via an assessment report. The platform may be provided via a sanitized landing page, links or other elements included in an assessment report, and/or other appropriate ways.

Process 800 may include receiving (at 820) a content selection. Such a selection may be received when a selection of a dark web link or other content is made from an assessment report (or otherwise made via assessment engine 100). Selections may be received via the navigable platform itself (e.g., a link from a first sanitized dark web page to a second sanitized dark web page may be selected).

The process may include receiving (at 830) sanitized content associated with the content selection. For instance, continuing the example above, the second sanitized dark web page may be received.

As shown, process 800 may include providing (at 840) the sanitized content. The sanitized content may be provided in a similar way to standard web pages or sites.

Some embodiments may collect and apply user configuration data and/or feedback to sanitization and/or presentation of sanitized content. For instance, some users may indicate a desire to remove all image content from the sanitized content while other users may indicate a desire to only obscure portions of images that match some filter criteria.

Figure 9:
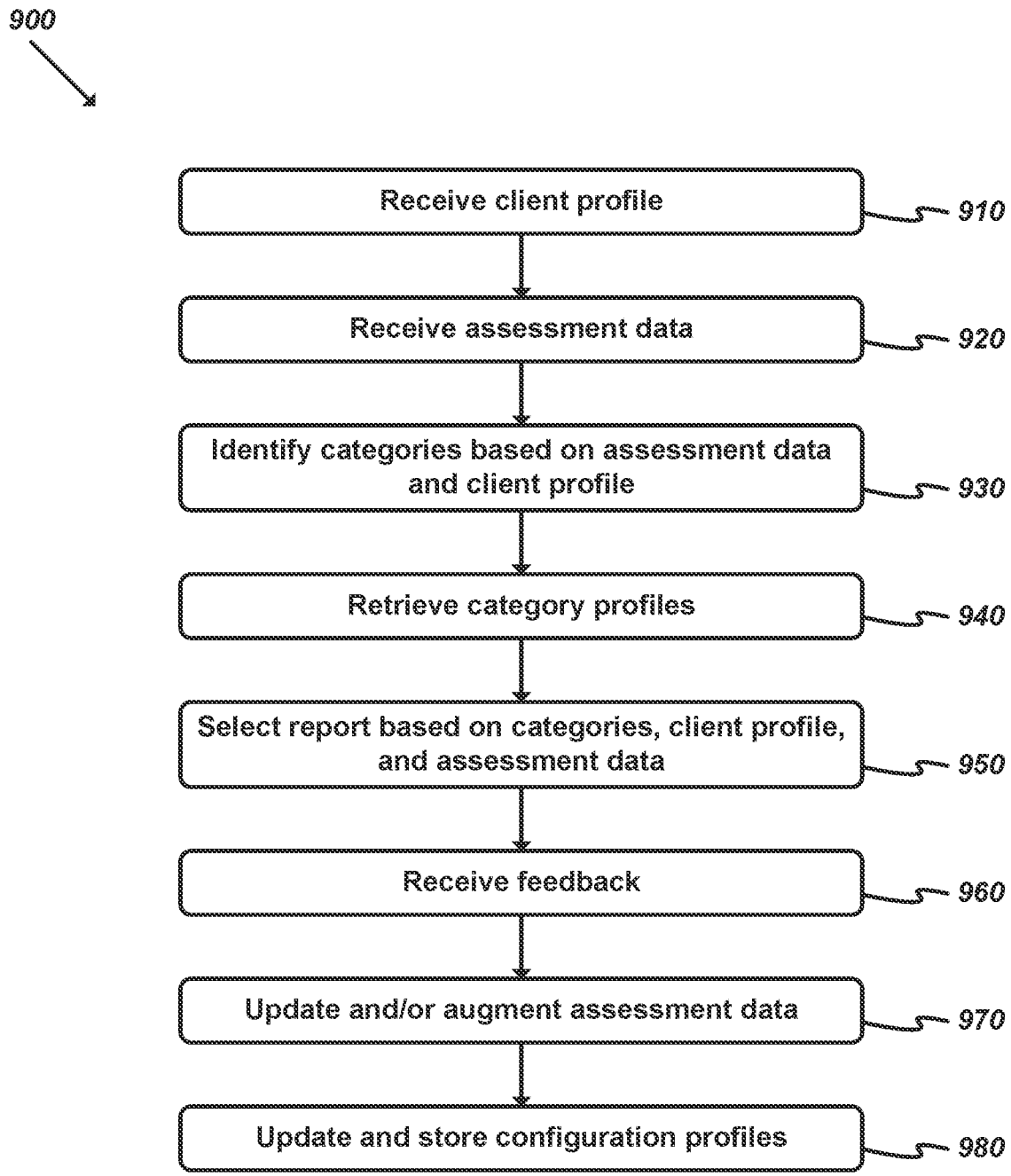
FIG. 9 illustrates a flow chart of an exemplary process that manages configuration profiles associated with the assessment engine.

FIG. 9 illustrates an example process 900 for managing configuration profiles associated with some embodiments. Such a process may for automatic and/or user-directed updates to configuration profiles such as category profiles 410, client profiles 420, report profiles 430, and/or other configuration data or profile data. The process may be performed whenever a user accesses the assessment engine 100, at regular intervals, and/or under other appropriate circumstances. In some embodiments, process 900 may be performed by assessment engine 100.

As shown, process 900 may include receiving (at 910) a client profile. A client may be identified in various appropriate ways, for instance by authenticating a username and/or password associated with a client user. As another example, a client may provide an email address, username, or other identifying information. In some cases, a client may be a business or organization that is associated with multiple client users.

Process 900 may include receiving (at 920) assessment data. Subjects of assessments may include any relevant business entities, individuals, domains, and/or other data identified during an assessment. Other relevant entities may include assessment resources, report types or templates, and/or other relevant data. Assessment data may be identified and extracted from various resources 320-390 by assessment engine 100.

The process may include identifying (at 930) categories based on the received assessment data, the client profile, and/or other relevant information. Categories may be identified by evaluating category profiles 410 to identify matching elements (e.g., text strings, keywords, etc.).

As shown, process 900 may include retrieving (at 940) category profiles based on the category identification. Each category identified at 930 may be retrieved based on the category name, identifier, etc.

Process 900 may include selecting (at 950) an assessment report template based on the identified category profiles, client profile, assessment data, and/or other relevant data. An assessment report template may be selected by matching various selection attributes (e.g., associated categories, assessment report type, default value, etc.) to information from one or more report profiles 430. The selected assessment report may be presented to a client using a UI of some embodiments.

The process may include receiving (at 960) feedback. As discussed above, such feedback may include selection (or non-selection) of various elements, direct feedback related to components or layout, etc.

As shown, process 900 may include updating and/or augmenting (at 970) the assessment data based on the received feedback. For instance, if a selection of a finance category is received, additional information associated with information or sub-categories related to the finance category may be collected. As another example, if a category is added based on user feedback, assessment information related to the category may be received.

Process 900 may include updating and storing (at 980) configuration profiles. If any profile information is updated (and/or generated) based on received feedback or other relevant factors, the updated information may be stored at a resource associated with assessment engine 100.

Figure 10:
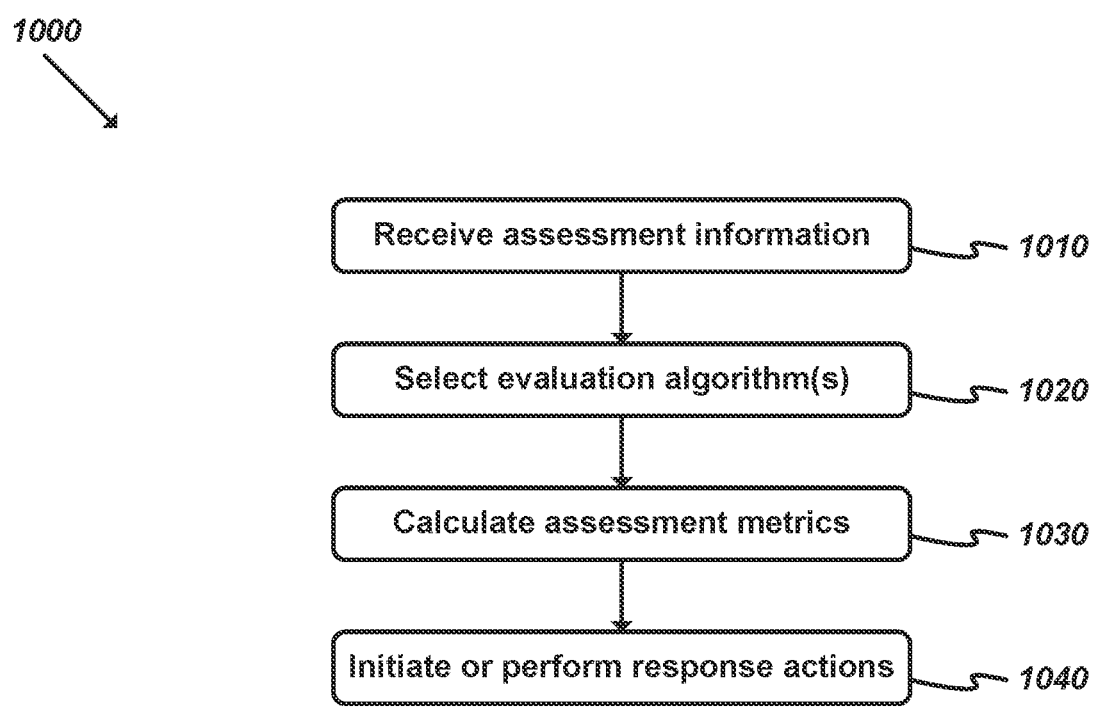
FIG. 10 illustrates a flow chart of an exemplary process that calculates assessment metrics and initiates responses based on the calculated metrics.

FIG. 10 illustrates an example process 1000 for calculating assessment metrics and initiating responses based on the calculated metrics. Such a process may be used to automatically monitor and respond to digital presence issues. The process may be performed when an assessment is generated or updated. In some embodiments, process 1000 may be performed by assessment engine 100.

As shown, process 1000 may include receiving (at 1010) assessment information. Such assessment information may be associated with various resources 320-390 and/or other elements.

Process 1000 may include selecting (at 1020) a set of evaluation algorithms. Various evaluation or scoring algorithms may be selected, such as by matching assessment categories to categories associated with various evaluation algorithm profiles. For instance, assessment information associated with a "finance" category may be evaluated using various appropriate algorithms or calculations (e.g., profit and loss, book to bill ratio, etc.).

The process may include calculating (at 1030) various assessment metrics using the selected algorithms. Such calculation may include mapping a calculated result to a score or metric (e.g., indicating a percentage value from zero to one hundred).

As shown, process 1000 may include initiating or performing (at 1040) various response actions. For instance, if an internal data metric for an organization falls below a threshold value, an automated message may be sent to an administrator-user associated with the organization.

One of ordinary skill in the art will recognize that processes 500-1000 may be implemented in various different ways without departing from the scope of the disclosure. For instance, the elements may be implemented in a different order than shown. As another example, some embodiments may include additional elements or omit various listed elements. Elements or sets of elements may be performed iteratively and/or based on satisfaction of some performance criteria. Non-dependent elements may be performed in parallel.

The processes and modules described above may be at least partially implemented as software processes that may be specified as one or more sets of instructions recorded on a non-transitory storage medium. These instructions may be executed by one or more computational element(s) (e.g., microprocessors, microcontrollers, digital signal processors (DSPs), application-specific integrated circuits (ASICs), field programmable gate arrays (FPGAs), other processors, etc.) that may be included in various appropriate devices in order to perform actions specified by the instructions.

As used herein, the terms "computer-readable medium" and "non-transitory storage medium" are entirely restricted to tangible, physical objects that store information in a form that is readable by electronic devices.

Figure 11:
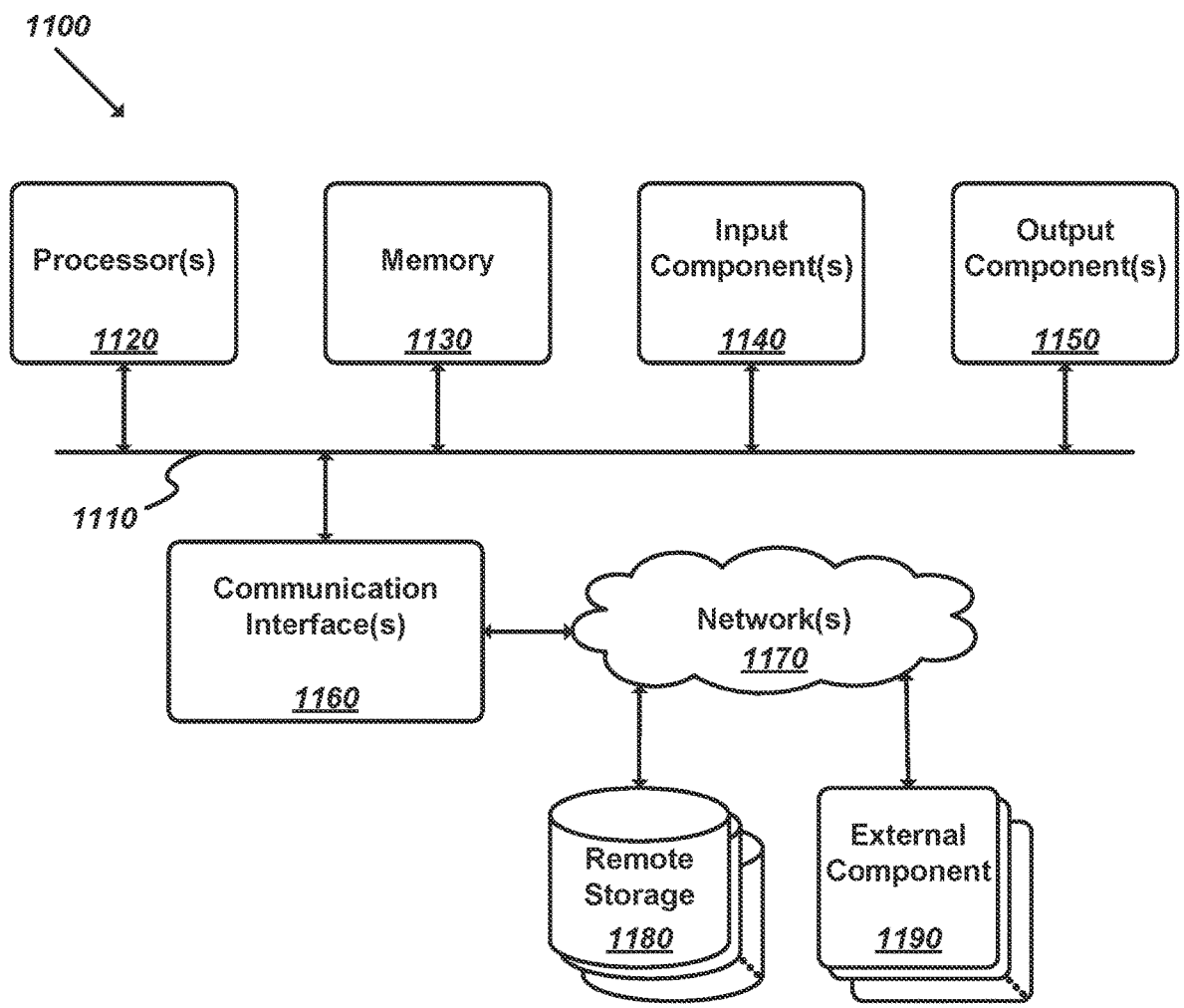
FIG. 11 illustrates a schematic block diagram of one or more exemplary devices used to implement various embodiments.

FIG. 11 illustrates a schematic block diagram of an exemplary device (or system or devices) 1100 used to implement some embodiments. For example, the environment described above in reference to FIG. 3 may be at least partially implemented using device 1100. As another example, the devices described above in reference to FIG. 1, FIG. 2, and FIG. 3 may be at least partially implemented using device 1100. As still another example, the processes described in reference to FIG. 5, FIG. 6, FIG. 7, FIG. 8, FIG. 9, and FIG. 10 may be at least partially implemented using device 1100.

Device 1100 may be implemented using various appropriate elements and/or sub-devices. For instance, device 1100 may be implemented using one or more personal computers (PCs), servers, mobile devices (e.g., smartphones), tablet devices, wearable devices, and/or any other appropriate devices. The various devices may work alone (e.g., device 1100 may be implemented as a single smartphone) or in conjunction (e.g., some components of the device 1100 may be provided by a mobile device while other components are provided by a server).

As shown, device 1100 may include at least one communication bus 1110, one or more processors 1120, memory 1130, input components 1140, output components 1150, and one or more communication interfaces 1160.

Bus 1110 may include various communication pathways that allow communication among the components of device 1100. Processor 1120 may include a processor, microprocessor, microcontroller, digital signal processor, logic circuitry, and/or other appropriate processing components that may be able to interpret and execute instructions and/or otherwise manipulate data. Memory 1130 may include dynamic and/or non-volatile memory structures and/or devices that may store data and/or instructions for use by other components of device 1100. Such a memory device 1130 may include space within a single physical memory device or spread across multiple physical memory devices.

Input components 1140 may include elements that allow a user to communicate information to the computer system and/or manipulate various operations of the system. The input components may include keyboards, cursor control devices, audio input devices and/or video input devices, touchscreens, motion sensors, etc. Output components 1150 may include displays, touchscreens, audio elements such as speakers, indicators such as light-emitting diodes (LEDs), printers, haptic or other sensory elements, etc. Some or all of the input and/or output components may be wirelessly or optically connected to the device 1100.

Device 1100 may include one or more communication interfaces 1160 that are able to connect to one or more networks 1170 or other communication pathways. For example, device 1100 may be coupled to a web server on the Internet such that a web browser executing on device 1100 may interact with the web server as a user interacts with an interface that operates in the web browser. Device 1100 may be able to access one or more remote storages 1180 and one or more external components 1190 through the communication interface 1160 and network 1170. The communication interface(s) 1160 may include one or more APIs that may allow the device 1100 to access remote systems and/or storages and also may allow remote systems and/or storages to access device 1100 (or elements thereof).

It should be recognized by one of ordinary skill in the art that any or all of the components of computer system 1100 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Device 1100 may perform various operations in response to processor 1120 executing software instructions stored in a computer-readable medium, such as memory 1130. Such operations may include manipulations of the output components 1150 (e.g., display of information, haptic feedback, audio outputs, etc.), communication interface 1160 (e.g., establishing a communication channel with another device or component, sending and/or receiving sets of messages, etc.), and/or other components of device 1100.

The software instructions may be read into memory 1130 from another computer-readable medium or from another device. The software instructions stored in memory 1130 may cause processor 1120 to perform processes described herein. Alternatively, hardwired circuitry and/or dedicated components (e.g., logic circuitry, ASICs, FPGAs, etc.) may be used in place of or in combination with software instructions to implement processes described herein. Thus, implementations described herein are not limited to any specific combination of hardware circuitry and software.

The actual software code or specialized control hardware used to implement an embodiment is not limiting of the embodiment. Thus, the operation and behavior of the embodiment has been described without reference to the specific software code, it being understood that software and control hardware may be implemented based on the description herein.

While certain connections or devices are shown, in practice additional, fewer, or different connections or devices may be used. Furthermore, while various devices and networks are shown separately, in practice the functionality of multiple devices may be provided by a single device or the functionality of one device may be provided by multiple devices. In addition, multiple instantiations of the illustrated networks may be included in a single network, or a particular network may include multiple networks. While some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

I claim:

1. A device that provides an assessment engine, the device comprising:
one or more processors configured to:
receive, at the assessment engine, an assessment query from a user;
identify, at the assessment engine, at least one entity based on the query;
retrieve, at the assessment engine, assessment information related to the at least one entity,
wherein the assessment information is retrieved from a set of resources including domain resources, technical resources, reputation resources, business resources, financial resources, legal resources, and dark web resources,
wherein the dark web resources comprise a navigable, sanitized copy of at least one dark web site, and
wherein the sanitized copy of at least one dark web site includes an image from the at least one dark web site and the image is at least partially obscured based on analysis of the image including comparison of a portion of the image to a portion of reference image,
generate, at the assessment engine, an assessment report based on the assessment information; and
provide the assessment report to the user.

2. The device of claim 1, wherein the assessment query comprises a uniform resource locator (URL) address associated with a domain.

3. The device of claim 1, wherein the assessment report includes a set of assessment categories, each assessment category associated with at least one resource from a set of assessment resources.

4. The device of claim 3, wherein the set of assessment categories is configurable by a client user.

5. The device of claim 1, wherein the one or more processors are further configured to, iteratively:
extract an assessment attribute from the assessment information; and
retrieve additional assessment information based on the extracted assessment attribute.

6. A non-transitory computer-readable medium, storing a plurality of processor executable instructions to:
receive, at an assessment engine, an assessment query from a user;
identify, at the assessment engine, at least one entity based on the query;
retrieve, at the assessment engine, assessment information related to the at least one entity,
wherein the assessment information is retrieved from a set of resources including domain resources, technical resources, reputation resources, business resources, financial resources, legal resources, and dark web resources,
wherein the dark web resources comprise a navigable, sanitized copy of at least one dark web site, and
wherein the sanitized copy of at least one dark web site includes an image from the at least one dark web site and the image is at least partially obscured based on analysis of the image including comparison of a portion of the image to a portion of reference image,
generate, at the assessment engine, an assessment report based on the assessment information; and
provide the assessment report to the user.

7. The non-transitory computer-readable medium of claim 6, wherein the assessment query comprises a uniform resource locator (URL) address associated with a domain.

8. The non-transitory computer-readable medium of claim 6, wherein the assessment report includes a set of assessment categories, each assessment category associated with at least one resource from a set of assessment resources.

9. The non-transitory computer-readable medium of claim 8, wherein the set of assessment categories is configurable by a client user.

10. The non-transitory computer-readable medium of claim 6, wherein the plurality of processor executable instructions are further to:
extract an assessment attribute from the assessment information; and
retrieve additional assessment information based on the extracted assessment attribute.

11. A method comprising:
receiving, at an assessment engine, an assessment query from a user;
identifying, at the assessment engine, at least one entity based on the query;
retrieve, at the assessment engine, assessment information related to the at least one entity,
wherein the assessment information is retrieved from a set of resources including domain resources, technical resources, reputation resources, business resources, financial resources, legal resources, and dark web resources,
wherein the dark web resources comprise a navigable, sanitized copy of at least one dark web site, and
wherein the sanitized copy of at least one dark web site includes an image from the at least one dark web site and the image is at least partially obscured based on analysis of the image including comparison of a portion of the image to a portion of reference image,
generating, at the assessment engine, an assessment report based on the assessment information; and
providing the assessment report to the user.

12. The method of claim 11, wherein the assessment query comprises a uniform resource locator (URL) address associated with a domain.

13. The method of claim 11, wherein the assessment report includes a set of assessment categories, each assessment category associated with at least one resource from a set of assessment resources and wherein the set of assessment categories is configurable by a client user.

14. The method of claim 11 further comprising:
extracting an assessment attribute from the assessment information; and
retrieving additional assessment information based on the extracted assessment attribute.

* * * * *